US008548965B2

(12) United States Patent
Devarakonda et al.

(10) Patent No.: US 8,548,965 B2
(45) Date of Patent: Oct. 1, 2013

(54) CHANGED FILES LIST WITH TIME BUCKETS FOR EFFICIENT STORAGE MANAGEMENT

(75) Inventors: Murthy V. Devarakonda, Peekskill, NY (US); Frank Stewart Filz, Beaverton, OR (US); Marc Adam Kaplan, Katonah, NY (US); James John Seeger, Jr., Porland, OR (US); Jason C. Young, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 631 days.

(21) Appl. No.: 12/061,323

(22) Filed: Apr. 2, 2008

(65) Prior Publication Data

US 2008/0201366 A1 Aug. 21, 2008

Related U.S. Application Data

(63) Continuation of application No. 11/128,781, filed on May 13, 2005, now abandoned.

(51) Int. Cl.
*G06F 7/00* (2006.01)
*G06F 17/00* (2006.01)
*G06F 13/14* (2006.01)

(52) U.S. Cl.
USPC ...................................................... 707/695

(58) Field of Classification Search
USPC ............. 707/3, 682–696, 610–625, 640–654, 707/825, 677; 705/35; 370/392, 412, 230–236
See application file for complete search history.

(56) References Cited

U.S. PATENT DOCUMENTS

| 6,055,534 | A | 4/2000 | Nishino | |
|---|---|---|---|---|
| 6,067,541 | A * | 5/2000 | Raju et al. | 1/1 |
| 6,189,016 | B1 | 2/2001 | Cabrera et al. | |
| 6,460,055 | B1 * | 10/2002 | Midgley et al. | 707/640 |
| 6,549,916 | B1 | 4/2003 | Sedlar | |
| 6,560,615 | B1 | 5/2003 | Zayas et al. | |
| 6,922,708 | B1 | 7/2005 | Sedlar | |
| 7,152,076 | B2 * | 12/2006 | Sundararajan et al. | 1/1 |
| 7,158,991 | B2 * | 1/2007 | Kekre et al. | 1/1 |
| 7,162,601 | B2 | 1/2007 | Yamagami | |

(Continued)

OTHER PUBLICATIONS

Boyce. "Microsoft Office Outlook 2003 Inside Out" and "Working With One-Time Events" Microsoft Press. Nov. 2003. (15 Pages).

(Continued)

*Primary Examiner* — Usmaan Saeed
*Assistant Examiner* — Cecile Vo
(74) *Attorney, Agent, or Firm* — Tutunjian & Bitetto, P.C.; Louis J. Percello

(57) ABSTRACT

There is provided, in a computer processing system, an apparatus for managing object data. The apparatus includes a changed objects manager for creating and managing a changed objects list that at least identifies the objects that have changed based on time of change. The changed objects list is associated with a plurality of time buckets. Each of the plurality of time buckets is associated with a respective date and time period and with object change records for objects having a timestamp falling within the respective date and time period. Each of the object change records is associated with a unique object identifier and the timestamp for a corresponding one of the objects. The timestamp specifies a date and a time corresponding to a latest one of a creation time or a most recent update time for the corresponding one of the objects.

24 Claims, 4 Drawing Sheets

(56) References Cited

U.S. PATENT DOCUMENTS

| | | | |
|---|---|---|---|
| 7,225,208 B2 | | 5/2007 | Midgley et al. |
| 7,620,624 B2 * | | 11/2009 | Stata et al. ............................ 1/1 |
| 7,630,924 B1 * | | 12/2009 | Collins et al. ................... 705/35 |
| 7,890,469 B1 * | | 2/2011 | Maionchi et al. ............. 707/654 |
| 2002/0111956 A1 | | 8/2002 | Yeo et al. |
| 2003/0187881 A1 | | 10/2003 | Murata et al. |
| 2005/0033777 A1 | | 2/2005 | Moraes et al. |
| 2005/0149493 A1 | | 7/2005 | Yamashita et al. |
| 2007/0226279 A1 | | 9/2007 | Barton et al. |

OTHER PUBLICATIONS

Cox, R., et al. "Communication Timestamps for File System Synchronization" Computer Science Group. 2001. (11 Pages).

Guruge. "Mainframe TCP/IP Management for Zero Downtime, High Performance Operations, Software Diversified Services (SDS), Vital Signs Vision Net IP Monitor (VIP) V4" Developed for SDS. Feb. 2005. pp. 1-26.

Weil, S., et al. "CRUSH: Controlled, Scalable, Decentralized Placement of Replicated Data" Storage Systems Research Center. Proceedings of the 2006 ACM/IEEE conference on Supercomputing (SC2006). Nov. 2006. (12 Pages).

Y.C. Jimenez et al., "DFSMShsm Primer" ibm.com/redbooks; IBM Corp.: Chapter 1; 2nd Edition; Dec. 2000; pp. 1-14.

A Verma et al. "An Architecture for Lifecycle Management in Very Large File Systems", Proc. 22nd IEEE/13th NASA Goddard Conf. on Mass Storage Systems and Technologes (MSST 2005); Aug. 2005; 9 pages.

Veritas, "Veritas Storage Foundation Technical Overview", Apr. 2002, pp. 1-28.

D. Freund, "Veritas' Shared File Foundation", Illuminata, Inc., Nashua, NH, Sep. 20, 2004; pp. 1-9.

J. Menon et al.,"IBM Storage Tank—A heterogeneous scalable SAN file system", IBM Systems Journal, vol. 42. No. 2; 2003; pp. 250-267.

IBM Total Storage SAN File System, "Planning Guide", Version 2, Release 2', IBM Corp; 2004, pp. 1-16.

IBM TIVOLI Storage Manager for Space Management for UNIX and LINUX; "User's Guide"; IBM Corp,; Chapter 1, Version 5.3; 2004; pp. 1-3.

D. Hewgill et al., "IBM TIVOLI Storage Management Version 4.2 Technical Guide", ibm.com/redbooks; IBM Corp.; Chapter 2; Jan. 2002; pp. 37-74.

* cited by examiner

CHANGED FILES LIST WITH TIME BUCKETS FOR EFFICIENT STORAGE MANAGEMENT

CROSS-REFERENCE TO RELATED APPLICATIONS

This application is a continuation of U.S. application Ser. No. 11/128,781, filed on May 13, 2005 now abandoned, which is incorporated by reference herein in its entirety.

BACKGROUND

1. Technical Field

The present invention relates generally to data file storage systems and, more particularly, to a changed files list with time buckets for efficient storage management.

2. Description of the Related Art

Use of electronic data storage for long-term recordkeeping is increasing at an exponential rate. Much of this data is stored in file systems. Moreover, much of this data is write-once and is to be retained for long periods of time.

The most commonly used disk storage devices are cheap, but not free and certainly not perfectly reliable nor absolutely durable. Accordingly, there is a need to migrate data to cheaper and/or more reliable media, a need to backup data, and a need to make replicas.

The vast amounts of data and numbers of files maintained make manual management of data backup, replication, retention, and deletion burdensome, error prone, and impractical. Also, government regulations and business requirements demand that data management be conducted according to policy rules that conform to laws, practices, and so forth.

Even in a typical consumer home, there will be tens of thousands of files. For example, consider the operating system(s) and application program files, as well as financial documents and digital media photos (e.g., jpeg), music (e.g., mp3), and movies (e.g., mpeg). In an enterprise with thousands of employees, customer databases, and so forth, there can be hundreds of millions of files to be managed.

Taken together, the multitude of legal and business requirements and the vast number of file objects to be managed necessitate the automated application of data management policy rules.

Currently, almost every implementation of a data management system for files operates by reading the complete catalog of all directory entries for all of the files each time a management job is initiated.

The overhead of searching and reading the file catalogs and directories (scanning the metadata of a file system) whilst performing policy or rule driven maintenance operations such as backup and data migration is chewing up a significant number of cycles, so much so that it is becoming a significant problem or expense in the operation of these systems, as exemplified by Tivoli Storage Manager(TSM) (data backup) and Tivoli Storage Manager for Space Management(HSM) (data migration, which is also known as hierarchical storage management).

Regarding the prior art, recent versions of data backup products for WINDOWS NTFS partially address the above-described problem by implementing a change journal based backup feature. However, this approach has some limitations. For example, one limitation is that the change journal based backup feature is not crash proof. Journal integrity is lost upon reboot. A reboot event necessitates a complete new scan of all file system meta-data and a re-synchronizing of file lists and stats with the backup server. Moreover, another limitation is that the change journal based backup feature can degrade file system performance. Further, another limitation is that the change journal based backup feature is only supported on certain versions of the WINDOWS operating system. Also, another limitation is that the change journal based backup feature does not address the meta-data scanning problem for HSM. Additionally, another limitation is that the space required by the change journal based backup feature is (potentially) unbounded (or until it breaks). That is, every change is recorded in the journal and so the journal keeps growing at a rate that is proportional to the rate of file system change. Thus, in practice, the journal is periodically processed and trimmed by the storage management subsystems). However, the rate and amount of change can outpace the storage capacity of the journal and/or the processing cycles allocated to the storage management subsystem(s). When this "breakage" occurs, change information is lost. The management system then has to resort to a traditional full metadata scan.

SUMMARY

These and other drawbacks and disadvantages of the prior art are addressed by the present invention, which is directed to a changed files list with time buckets for efficient storage management.

The present invention may be implemented, e.g., as an apparatus, a method, and a computer program product.

According to an aspect of the present invention, in a computer processing system, there is provided an apparatus for managing object data. The apparatus includes a changed objects manager for creating and managing a changed objects list that at least identifies the objects that have changed based on time of change. The changed objects list is associated with a plurality of time buckets. Each of the plurality of time buckets is associated with a respective date and time period and with object change records for objects having a timestamp falling within the respective date and time period. Each of the object change records is associated with a unique object identifier and the timestamp for a corresponding one of the objects. The timestamp specifies a date and a time corresponding to a latest one of a creation time or a most recent update time for the corresponding one of the objects.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

Figure 1:
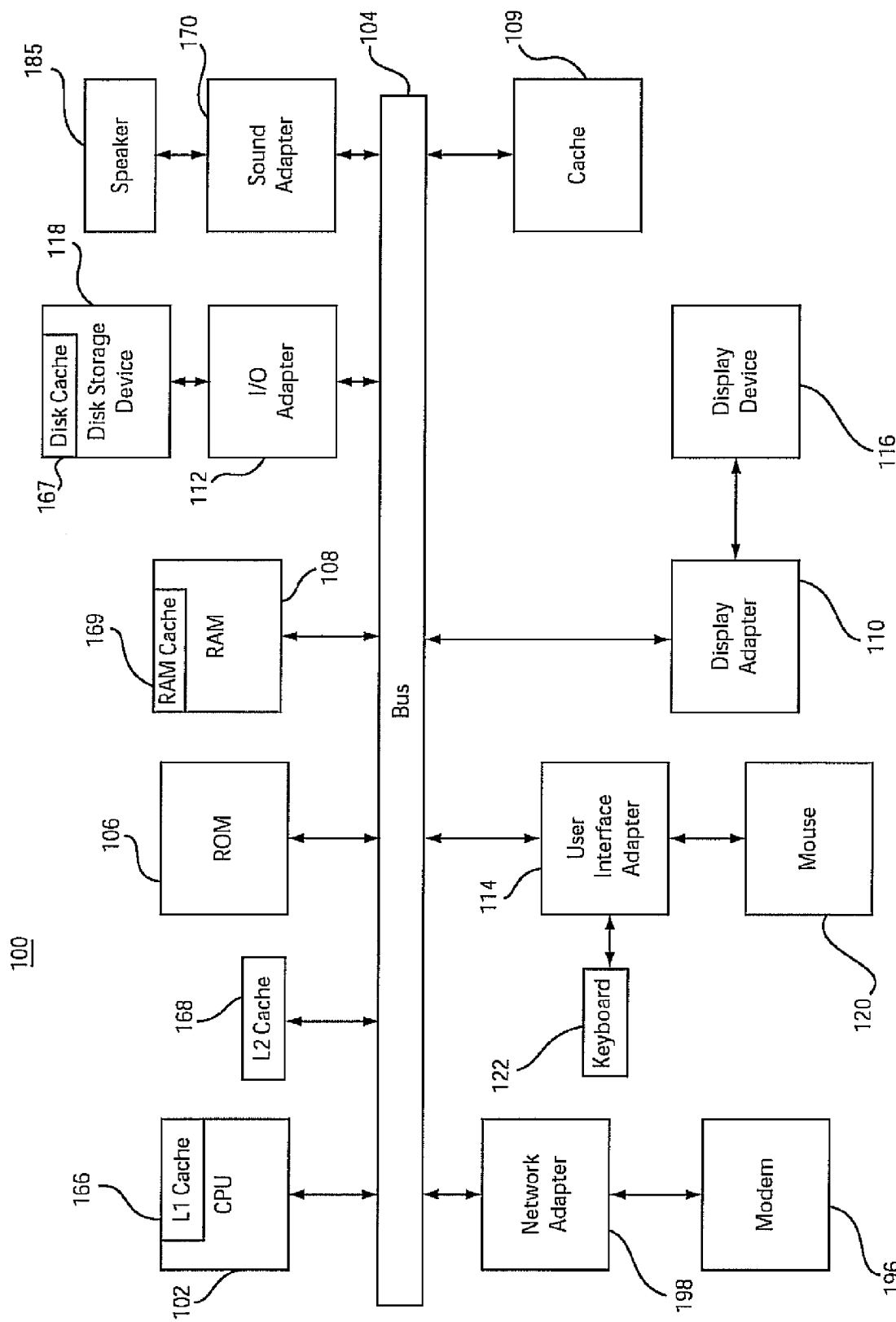
FIG. 1 is a block diagram illustrating an exemplary computer processing system to which the present invention may be applied, in accordance with the principles of the present invention.

These and other aspects, features and advantages of the present invention will become apparent from the following detailed description of exemplary embodiments, which is to be read in connection with the accompanying drawings.

DETAILED DESCRIPTION OF PREFERRED EMBODIMENTS

The present invention is directed to a changed files list with time buckets for efficient storage management. It is to be appreciated that while the present invention is primarily described herein with respect to files, the present invention may be implemented with respect to any set of objects within and processed by a computer processing system. Moreover, the present invention is particularly suited to a set of managed objects most of which do not change during a given period of time, but where it is desired to concisely track which ones of the objects have changed.

Advantageously, the present invention is useful within computerized data file storage systems for efficiently selecting files that have been accessed recently, where such files are typically the primary subjects of data management tasks or jobs. Of course, given the teachings of the present invention provided herein, one of ordinary skill in this and related arts will contemplate these and other applications and systems to which the present invention may be applied, while maintaining the scope of the present invention.

In an exemplary embodiment of the present invention, we maintain a "changed file list", which is a persistent data structure with just one short file-change record for each file. The changed file list is (conceptually) partitioned into time buckets. For illustrative purposes, consider that there is a bucket for every hour of every day. Of course, it is to be appreciated that different granularities of time could be chosen, as described herein below, while maintaining the scope of the present invention. The file system is augmented such that each time the metadata of a file f is updated, the current date and time of day (t_now) is compared with the timestamp representing the last metadata change (t_prev) of file f. If t_now is a different hour or day than t_prev, then the file-change record for f is (logically) moved to the time bucket representing the current date and hour (hour_of(t_now)). Otherwise, the file-change record is already in the correct bucket and need not be accessed nor modified. Of course, after this test, we go ahead and update the last metadata change timestamp of f just as it would be in a traditional Posix-like file system.

It is to be noted that the changed file list does not grow except when new files are created within the file system. The t_now to t_prev comparison adds a trivial few instructions to the traditional metadata processing by the file system. The processing required to move a file-change record from one time bucket to another is roughly the same as moving/renaming (Posix mv) a file from one directory to another. However, in one embodiment, we limit the moves between buckets to at most once per hour for each accessed file. Of course, other time limits for moving between buckets may also be used, while maintaining the scope of the present invention.

A storage management process that runs occasionally (typically a few times each week) such as, e.g., a backup job, normally should need to only consider and process files that have changed since the previous run. Knowing the hour and date of the last run, the storage management process can readily determine which files have been changed (and/or whose metadata has changed) by just reading the file-change records included within the time buckets representing the hours between now and then. Since a bucket holds file-change records covering a whole hour, the storage management process may consider some files in buckets that represent the hour(s) during which its previous run occurred. By reading the complete metadata for just those files, it can determine which ones need to be processed. However, the vast majority of unchanged files will be represented by old buckets and can be completely ignored by the storage management process.

It should be understood that the elements shown in the Figures may be implemented in various forms of hardware, software or combinations thereof. Preferably, these elements are implemented in software on one or more appropriately programmed general-purpose digital computers having a processor and memory and input/output interfaces.

It is to be appreciated that as used herein, the phrase "at least one", when used to refer to more than one object (e.g., A and B), refers to one of A or one of B or one of A and one of B.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Turning to FIG. 1, an exemplary computer processing system to which the present invention may be applied is indicated generally by the reference numeral 100. The computer processing system 100 includes at least one processor (CPU) 102 connected in signal communication with other components via a system bus 104. A read only memory (ROM) 106, a random access memory (RAM) 108, a display adapter 110, an I/O adapter 112, a user interface adapter 114, a sound adapter 170, and a network adapter 198, are each connected in signal communication with the system bus 104.

The CPU 102 may include one or more "on-board" caches (e.g., L1 caches) (hereinafter "L1 cache") 166. Moreover, the CPU may be in signal communication with one or more "external caches" (e.g., disk caches and RAM caches) (hereinafter "disk cache" 167 and "RAM cache 168"). Further, the CPU 102 may also be in signal communication with one or more other "external caches" (e.g., on a chip other than the CPU and RAM chips such as, e.g., L2 caches) (hereinafter "L2 cache") 168. Of course, other cache configurations may also be employed in accordance with the present invention while maintaining the scope of the present invention.

A display device 116 is connected in signal communication with system bus 104 by display adapter 110.

A disk storage device (e.g., a magnetic or optical disk storage device) 118 is connected in signal communication with system bus 104 by I/O adapter 112.

A mouse 120 and keyboard 122 are connected in signal communication with system bus 104 by user interface adapter 114. The mouse 120 and keyboard 122 are used to input and output information to and from computer processing system 100.

At least one speaker (herein after "speaker") 195 is connected in signal communication with system bus 104 by sound adapter 170.

A (digital and/or analog) modem 196 is connected in signal communication with system bus 104 by network adapter 198.

Figure 2:
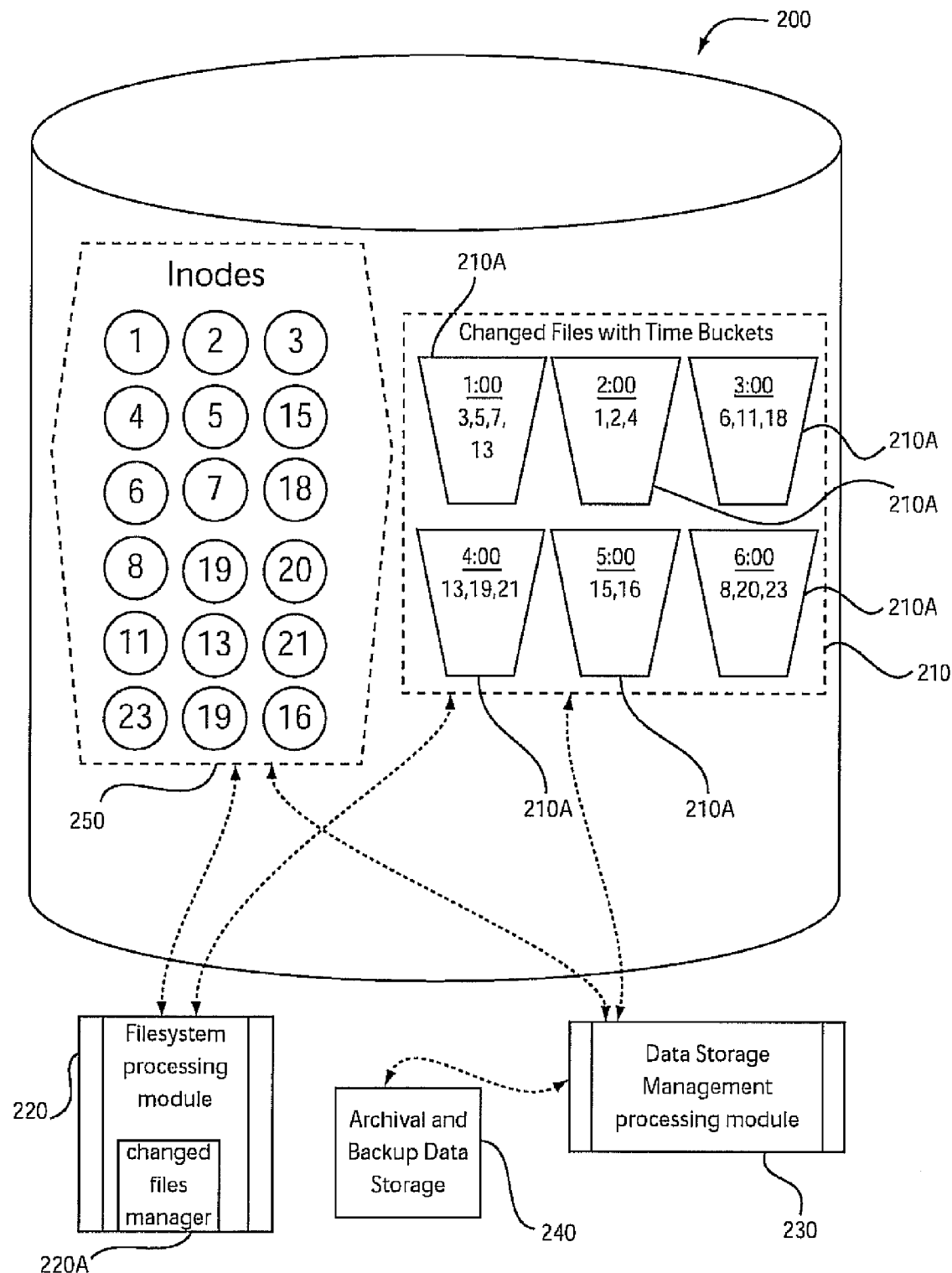
FIG. 2 is a block diagram illustrating an exemplary data storage management (DSM) system in accordance with the principles of the present invention.

Turning to FIG. 2, a data processing system having file and data storage management subsystems augmented with a changed files list with time buckets is indicated generally by the reference numeral 200.

Turning to FIG. 2, an exemplary data storage management (DSM) system is indicated generally by the reference numeral 200. The data storage management system 200 includes an exemplary changed files list 210 with time buckets 210a in accordance with the principles of the present invention. Moreover, the data storage management system 200 includes a file system processing module 220, a data storage management processing module 230, an archival and backup data storage device 240. File inodes 250 are used by the file system processing module 220, and the data storage management processing module 230.

The changed files list 210 (with time buckets) relates to the present invention. The changed files list 210 with time buckets is a data structure that organizes subsets of inode numbers into buckets. Each bucket 210A (also represented herein by the reference character "B") represents a time period. The presence of an inode number i in a bucket B records the fact that the file represented by inode number i last changed during the time represented by bucket B. For example, in FIG. 2, the bucket labeled "3:00" represents files whose last change occurred on or after 3 o'clock but before 4 o'clock. The bucket logically includes the files represented by inode numbers 6, 11, and 18.

A changed files manager 220A, disposed in the file system processing module 220, creates and manages the changed files list 210. While the changed files manager 220A is shown and described with respect to file system processing module 220, it is to be appreciated that the changed files manager 220A may be implemented as a stand alone device, or may be implemented in one or more other elements of a data storage management (DSM) system or a computer processing system, while maintaining the scope of the present invention.

A description will now be given regarding what is considered to be a file and what is considered to be a change. Of course, the present invention is not limited to the preceding definitions and, thus, given the teachings of the present invention provided herein, other definitions and interpretations of what is considered a file and a change may also be employed in accordance with the principles of the present invention, while maintaining the scope of the present invention.

In Posix-like systems, a file is represented by an inode and each inode within a file system has a unique number (IBM SanFS has the same concepts, except they use the word "object" and the phrase "object identifier."). The inode includes metadata that describes some attributes of the file and also includes pointers to the data blocks that hold the data of the file. A file change is an event that causes any of the data or the meta-data to be modified (this includes any change in the file length, ownership, permissions (ACLs), and so forth).

We also must consider any change that causes a file to be renamed, deleted, or to acquire a new alias name. Indeed, on a Posix/Linux system, changing any file attribute or renaming a file causes the ctime attribute of the inode of that file to be updated. Modifying, appending or truncating the file data causes the mtime attribute of the inode of that file to be updated.

Directories may be considered to be special case files. Renaming, adding or removing an entry e from a directory d is a modification (mtime) of the directory d, as well as a change (ctime) to the inode referenced by entry e.

The meta-data field atime (last access time), which records the last time at which any application accessed the file, is a special case, as except for the atime field itself, there are no changes to the file or its meta-data. An atime only change to a data file is usually of no interest to a data backup system. However, it may well be of interest to other data management systems such as, e.g., a hierarchical storage management (HSM) system with a policy of keeping recently accessed files in primary storage and moving unused files to secondary storage.

An atime only change to a directory is usually of no interest to a typical data management system.

We must also consider a complication introduced by the hard link concept, typical of Posix-like systems. A single inode number can appear one or more times in one or several directories. Thus, a single inode/file can be known by several different names under several different paths.

A description will now be given regarding file change records in the changed files list with time buckets.

Our changed files list is a list of file-change records. The list is partitioned into time buckets and/or otherwise stored and organized so that file-change records can be rapidly accessed by the value of their timestamps. Two records with timestamps that indicate the same date and hour are considered to be in the same time bucket. While we use a granularity of an hour for illustrative purposes, any other convenient amount of time may be chosen for use in accordance with the principles of the present invention, while maintaining the scope of the present invention.

Object deletion is a special case. Besides the time buckets, the changed file list also includes a deleted objects bucket (popularly known as the bit bucket).

The changed files list and its buckets are persistent data structures that are organized in a way that records can be efficiently (a) created afresh, OR (b) located within a time bucket and (c) removed from a time bucket, updated and then appended to (or inserted into) the time bucket representing the current date and hour or appended to the deleted objects bucket.

Each file-change record includes several fields. One such field in a file-change record is a timestamp for the record. This is the date and time when the file-change record was created or most recently updated. We also call this the btime (bucket time) of the file object. The timestamp value need not represent a real wall clock time. For example, any increasing values might be used. Of course, other values and representations may also be used to provide a timestamp or time indication while maintaining the scope of the present invention.

Another field in a file-change record is the object inode number. That is, the inode number of the file (or directory.)

Moreover, another field in a file-change record is the type of object. This indicates an ordinary data file, a directory, or an inode that has no associated data, such as a symbolic link or a device, a socket, and so forth. Of course, this information could be recovered by fetching the object inode, but its cheap and easy to encode this as just an extra byte of information in the file-change record, which will allow any management processes reading the changed files list to avoid the overhead of an inode fetch for any file types the management process should ignore. For example, a data backup process might be configured to ignore device inodes.

Further, another field in a file-change record is a change type code word that indicates the nature of the change or (accumulated) changes. A change type coding scheme allows any sensible combination of changes to be indicated by a single code word.

One exemplary change type is a directory entry insertion. A directory entry referring to object inode was inserted (linked) into the parent directory. The file was just given a name within the parent directory.

Another change type is a directory entry deletion. A directory entry referring to the subject inode was deleted (unlinked) from the parent directory. The file (subject inode) could have been deleted or renamed.

Yet another change type is a directory entry rename. This is a special case of two previous entries that are combined. The subject file was renamed but stayed within the same parent directory.

Moreover, another change type is that the mtime of the subject inode was updated. This usually results because the contents of the file were modified.

Further, another change type is that the ctime of the subject inode was updated. This usually results because some meta-data/attribute of the file was updated.

Also, another change type is that the atime of the subject inode was updated. This usually results because an application read at least some of the file data. If all of the management systems that will use a changed files list do not care about atime changes, then atime-only-change records may be omitted. Thus, this can be configured as needed, based on the implementation.

Also, another field in a file-change record is a list of parent inode numbers of the directories through which the object has been and may be accessed. Some implementations may use this field to help locate a (path)name for the object inode. This is described further herein below. Other implementations may maintain a separate objects-to-parent-directories map and, thus, may not require this field.

We include the parent inode numbers so that the complete pathnames for the subject file can be found, if need be, without conducting a full search of the directories of the file system, as follows. In a first step, we find a directory entry with the subject's inode number within the (immediate) parent directory. This (immediate parent directory) includes the name of the subject file. In a second step, we walk up the tree towards the root by finding the inode number of the grand parent stored in the " . . . " entry within the parent. Then, we find the directory entry with the parent's inode number within the grandparent directory. This directory entry includes the name of the parent directory. We repeat step 2 for higher-level directories until the root inode of the file system is reached. The root inode will have a distinguished, well known inode number and/or the root directory will include a special-case " . . . " entry. A pathname for the subject file is just (the reverse) of the list of names discovered whilst walking up the tree. Most objects have just one parent. However, POSIX allows a single non-directory object to be referred to by multiple directory entries. This sort of walk-up-the-tree approach is also performed by the Posix command /bin/pwd.

Alternatively, the storage management system might find the path(s) that leads to a subject inode by maintaining an inode to path look aside table.

Maintenance of objects-to-parent-directories maps and/or path look aside tables can be done step-by-step with each file system change or can be done periodically or on-demand by using the changes files list itself to find changed directories. The changed directories can then be scanned to update and/or re-generate the relevant entries in the maps or tables.

A description will now be given regarding when to add (or update and move) entries to (or within) the changed files list.

The changed file list need not be updated for every change to a given file. For most management purposes, for any given file, it will be sufficient to record, e.g., the following; the first meta-data or data change that occurs within an hour (or other suitable unit of time granularity). Recall these changes always include an update to one or more of the following: atime; ctime; and mtime.

Moreover, presuming we are maintaining the list of parent inode numbers in the change-record, the following may also be recorded: each unlink of the inode from a directory, and each link of the inode into a directory.

Typically, an active or hot file and its inode will undergo several or many meta-data and/or data changes while being accessed and/or manipulated by an application. We want to capture the fact that a particular file has changed, but we do not need to record every change in the changed files list, since that would introduce untenable overhead into a file management system.

A description will now be given regarding an embodiment of the invention, relating to updating the changes files list.

Presume that we augment a conventional state of the art file system (e.g., but not limited to, EXT3, JFS, and so forth) such that the system executes the following steps described with respect to FIG. 3 below, e.g., prior to performing an inode or directory update for a file.

Figure 3:
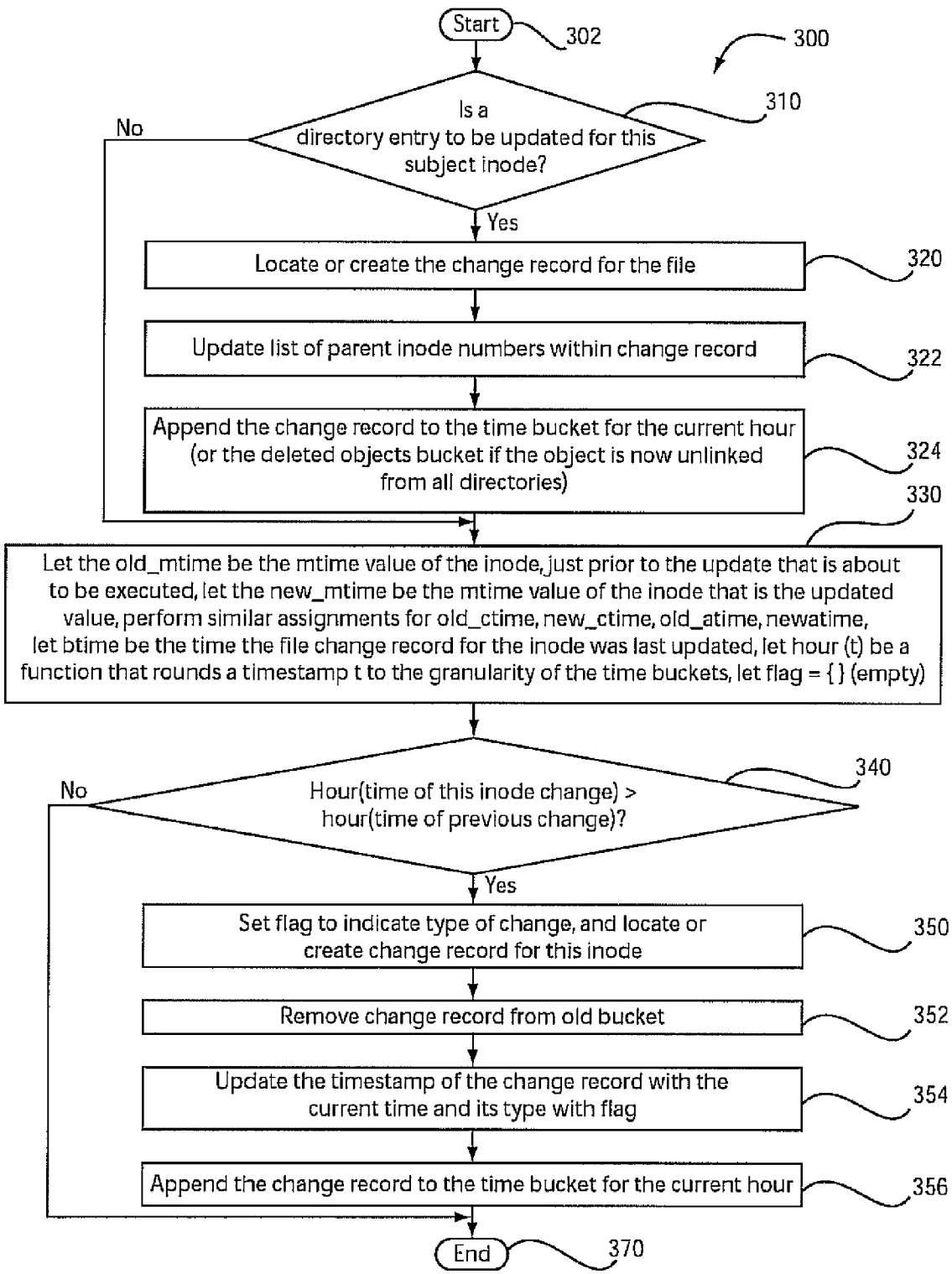
FIG. 3 is a flow diagram illustrating an exemplary process for updating a changed files list in accordance with the principles of the present invention.

Turning to FIG. 3, an exemplary process for updating a changed files list is indicated generally by the reference numeral 300. A start block 302 passes control to a decision block 310. The decision block 310 determines whether or not a directory entry is to be updated for a subject inode. If so, then control is passed to a function block 320. Otherwise, control is passed to a function block 330.

The function block 320 locates or creates the change record for the file, and passes control to a function block 322. The function block 322 updates the list of parent inode numbers within the change record, and passes control to a function block 324. The function block 324 appends the change record to the time bucket for the current hour (or the deleted objects bucket if the object is now unlinked from all directories), and passes control to function block 330.

The function block 330 lets the old_mtime be the mtime value of the inode, just prior to the update that is about to be executed, lets the new_mtime be the mtime value of the inode that is the updated value, performs similar assignments for old_ctime, new_ctime, old_atime, new_atime, lets btime be the time the file-change record for the inode was last updated, lets hour(t) be a function that rounds a timestamp t to the granularity of the time buckets, lets flag={ } (empty), and passes control to a decision block 340. With respect to function block 330, nominally hour(t) rounds down to the hour, but more generally we only need the following property: hour(t1)<hour(t2), when timestamp t1 belongs to an older bucket than timestamp t2. The function block 340 determines whether or not hour(time of this inode change)>hour(time of previous change) In particular, function block 340 may perform the following determinations: hour(new_mtime)>hour (old_mtime), hour(new_ctime)>hour(old_ctime), hour (new_atime)>hour(old_atime).

If hour(time of this inode change)≤hour(time of previous change), then control is passed to an end block 370. Otherwise, if hour(time of this inode change)>hour(time of previous change), then control is passed to a function block 350.

The function block 350 sets the flag to indicate the type of change, locates or creates the change record for this inode, and passes control to a function block 352. With respect to function block 350, in particular: when hour(old_mtime) <hour(new_mtime), then flag:=flag 4 {mtime_updated}; when hour(old_ctime)<hour(new_ctime), then flag:=flag 4 {ctime_updated}; and when hour(old_atime)<hour(new_atime), then flag:=flag 4 {atime_updated}.

The function block 352 removes the change record from the old bucket, and passes control to a function block 354. With respect to function block 352, the action of removing the change record from the old bucket can be a logical delete. That is, a reclamation of storage can be postponed to a convenient later time when old buckets will be compacted, similar to the known art of maintaining B-trees and similar data structures. Of course, other courses of action with respect to removing the change record may also be employed while maintaining the scope of the present invention.

The function block 354 updates the timestamp of the change record with the current time and its type with flag, and passes control to a function block 356. The function block 356 appends the change record to the time bucket for the current hour (otherwise there is no need to update the change-record for the object), and passes control to end block 370.

It is to be noted that for a special case, namely, for a newly created file, we combine the change records to indicate the directory and other update and append a single (i.e., combined) new change-record to the time bucket for the current hour.

A description will now be given regarding maintaining a changed files list correctly in spite of a crash/reboot.

Just like the inodes, directories and other metadata, the file-change records and the buckets of the changed files list are metadata that should be maintained in a way that is robust and consistent across system crashes and restarts. This can be accomplished by journaling all updates and including updates to the file change records and buckets within the same transaction scope as related to the inode and directory updates.

Notice that a typical journaling file system should record all inode and directory updates and, thus, very little or even no additional information may be required in the journal to facilitate the replay of changed file list updates during crash recovery.

A description will now be given regarding time bucket granularity.

For illustrative purposes, we have supposed that each time bucket represents all the files that changed during a particular hour. However, it is to be appreciated that the hour unit is somewhat arbitrary and, given the teachings of the present invention provided herein, any convenient amount of time could be chosen as the unit of time bucket granularity while maintaining the scope of the present invention. Also, the amount of time represented by buckets can be variable. That is, different buckets can represent different amounts of time. Some considerations and variations in choosing and using different time granularities are provided herein for illustrative purposes. However, it is to be appreciated that other considerations and variations may also be considered and implemented with respect to unit of time bucket granularity and using different times (amount of times) for different buckets in accordance with the principles of the present invention, while maintaining the scope of the present invention.

One consideration in choosing and using different time granularities relates to tradeoffs of overhead. Larger units of granularity will decrease the overhead of maintaining the changed files list, since there will be less updating and moving of file change records. On the other hand, each management process will have to scan through bigger buckets of file change records to be sure to find all files that have changed since a previous run.

Another consideration in choosing and using different time granularities relates to efficiency and simplicity of the hour(t) function. It may be a good idea to choose a unit of granularity so that two timestamps can be quickly and simply compared to see if they represent times within the same bucket. For example, if timestamps are represented by an integral number of milliseconds, then a conventional hour would be 3,600,000 timestamp units. However, we might choose time bucket granularity to be 4,194,304 (a power of 2), so that timestamps could be converted to bucket time units by a single binary shift instruction.

Moreover, another consideration in choosing and using different time granularities relates to practical choice. We expect that most files are not continually modified. A typical file is created and/or opened by an application, operated on, and then closed within a short time (e.g., an hour or less). Most file management jobs are run once or a very few times a day. To avoid re-scanning files that really have not changed, it would be preferable, but not mandatory, to have at least several buckets worth of time elapse between runs of the same management job. Hence, we expect any choice of granularity between a few minutes and a few hours will be appropriate for current systems. However, as mentioned herein, other units of granularity may also be employed.

Also, another consideration in choosing and using different time granularities relates to buckets on demand. At any convenient time, e.g., just prior to the starting of a file management job, the bucket accumulating changes can be closed and a new bucket designated by the current time can be created and begin accumulating change records. In this variation of the scheme, the hour(t) function depends on the closing times of the buckets.

Alternatively, with respect to buckets on demand, the closing times of buckets can be coordinated with file system snapshots. Each snapshot operation will close the bucket accumulating change records and create a new bucket. Several known-art file systems such as VERITAS FILE SYSTEM and IBM's Storage Tank (now known as IBM San File System) support snapshot versioning. In this variation of the scheme, the hour(t) function yields a snapshot version number.

Also, another consideration in choosing and using different time granularities relates to merging buckets. Any two or more buckets adjacent in time can be merged into a single larger bucket, whenever that is convenient or desirable. For example, very old change records can be gathered into fewer buckets, by day, by week by month, by year, and so forth.

Additionally, another consideration in choosing and using different time granularities relates to the two bucket solution.

In this special case (that is logically a further refinement of buckets on demand and merging buckets described above), which reduces some of the bookkeeping overhead, we can keep just two buckets. One bucket with records for all files that have NOT changed since a particular time T, and one bucket with records for files that have changed after time T.

A description will now be given regarding using the changed files list with time buckets for data management.

A typical data management job needs to find all the files within a file system that have changed since the last run. Using the changed files list with time buckets makes this simple and efficient. Moreover, multiple kinds of management jobs can all use the same changed files list with time buckets, even if they run on different schedules. Examples of different kinds of data management jobs are: backup, archiving, migration (moving data from one set of devices to another to improve or balance performance and/or lower costs, etc.), accounting, usage analysis and planning.

Figure 4:
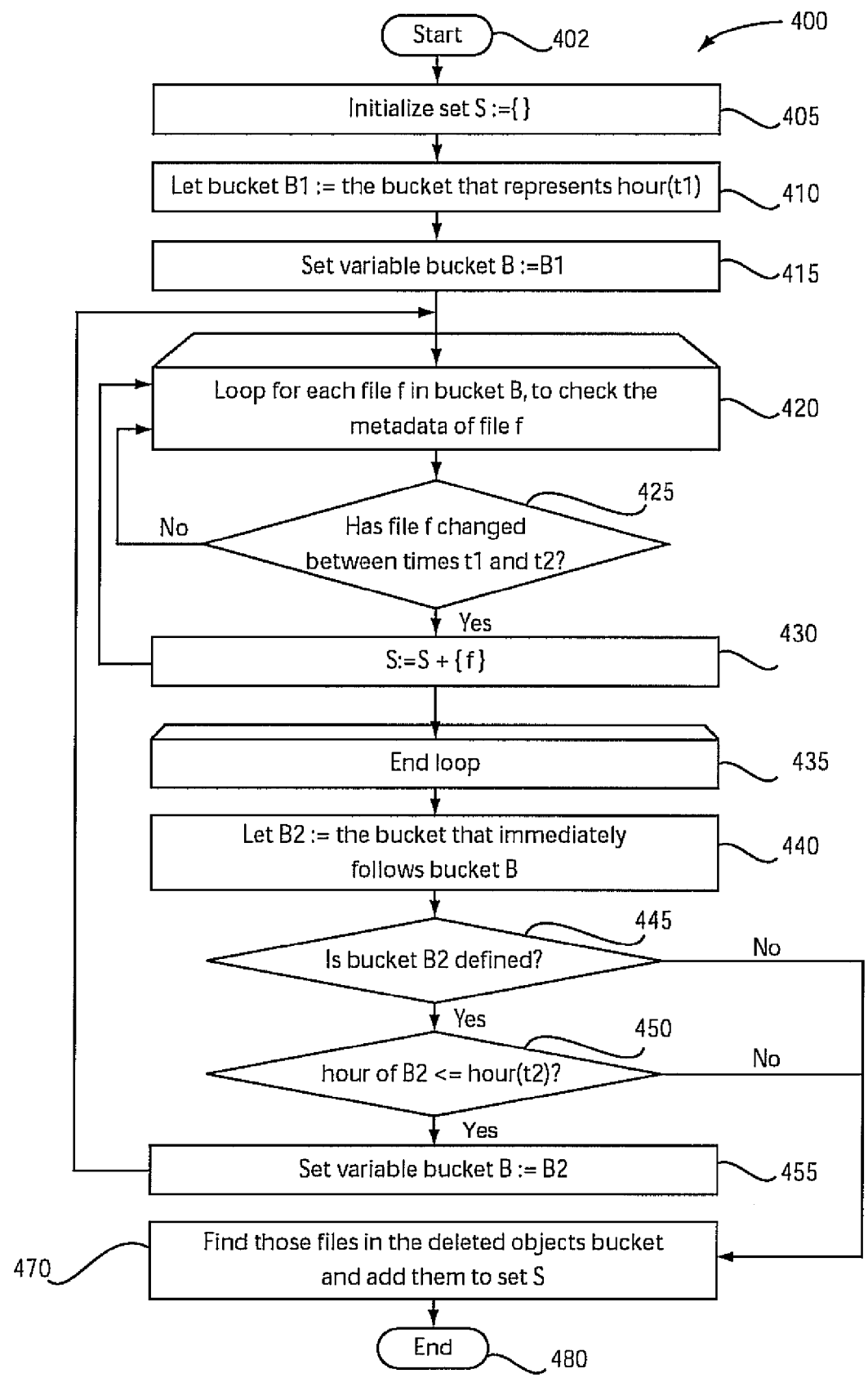
FIG. 4 is a flow diagram illustrating an exemplary process for using a changed files list with time buckets in accordance with the principles of the present invention.

Turning to FIG. 4, an exemplary process for using a changed files list with time buckets is indicated generally by the reference numeral 400. The process 400 relates to a data management operation, in particular, finding the set S of all files (or the corresponding inode numbers) whose data or metadata has changed between two times t1 and t2, where t1 is earlier than t2.

A start box 402 passes control to a function block 405. The function block 405 initializes the set S:={ }, namely the empty set, and passes control to a function block 410. The function block 410 lets bucket B1 be the bucket that represents hour(t1), and passes control to a function block 415. With respect to function block 410, stated another way, B1 is the foremost bucket that might include a file changed at time t1 or later.

The function block 415 sets variable bucket B:=B1, and passes control to a function block 420.

The function block 420 performs a loop for each file f in bucket B, checking the metadata of file f, and begins the loop by passing control to a decision block 425. With respect to function block 420, it is to be noted that the first and last buckets we visit may include some files that changed before t1 or after t2. Also, an implementation might choose to defer removing entries from buckets. Thus, we may need to check the change time of each file f in bucket B before adding it to the set S.

Accordingly, decision block 425 determines whether or not file f changed between times t1 and t2. If so, the control is passed to a function block 430. Otherwise, control is returned to decision block 420.

The function block 430 adds file f to set S, and passes control to a loop limit block 435 when there are no more files f in bucket B or returns control to function block 420 when there is another file f in bucket B.

The loop limit block 435 ends the loop, and passes control to a function block 440. The function block 440 lets B2 be the bucket that immediately follows bucket B, and passes control to a decision block 445. The decision block 445 determines whether or not there is such a bucket B2 (i.e., is bucket B2 defined in the changed files list). If so, the control is passed to a decision block 450. Otherwise, control is passed to a function block 470.

The decision block 450 determines whether or not the hour of B2≤hour(t2). If so, then control is passed to a function block 455. Otherwise, control is passed to a function block 470. In other words, if there is not bucket following bucket B or the bucket following bucket B represents an hour>hour(t2), then we are done.

The function block 455 sets variable bucket B:=B2, and returns control to function block 420 (beginning a new execution of the loop to consider the files in bucket B).

Since set S now includes all of the files that have changed between times t1 and t2, we may also want S to include the set of files deleted between times t1 and t2. Accordingly, the function block 470 finds those files in the deleted objects bucket, adds them to set S, and passes control to an end block 480. The deleted objects bucket should be organized in such a way (using well known art) that all entries representing deletions between two times t1 and t2 can be efficiently retrieved.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. In a computer processing system, an apparatus including a memory for managing file data, comprising:

a changed files manager for creating and managing a changed files list that at least directly identifies the files that have changed based on time of change, the changed files list associated with a plurality of time buckets, each of the plurality of time buckets directly representing a respective date and time period and being associated with file change records for files having a timestamp falling within the respective date and time period, each of the file change records associated with a unique file identifier and the timestamp for a corresponding one of the files, the timestamp specifying a date and a time corresponding to a latest one of a creation time or a most recent update time for the corresponding one of the files; and a file system processing module comprising a processor for comparing a current date and time against a timestamp for a given file, creating a new file change record for the given file and inserting the new file change record into a corresponding one of the plurality of time buckets having the respective time date and time period in which the timestamp falls when an existing file change record does not exist for the given file, and moving the existing file change record for the given file into the corresponding one of the plurality of time buckets having the respective time date and time period in which the timestamp falls when the current date and time is different than the timestamp and the existing file change record already exists for the given file, wherein the existing file change record is maintained in a currently inserted time bucket, when the timestamp matches the current date and time and falls within the respective data and time period of the currently inserted time bucket and the existing file change record already exists for the current file.

2. The apparatus of claim 1, wherein the changed files list is configured for use by a storage management process.

3. The apparatus of claim 1, wherein the storage management process includes at least one of data backup and data replication.

4. The apparatus of claim 1, wherein the apparatus is implemented in a file system, and an amount of file change records in the changed files list is without change except when a new file is created or when an existing file is deleted from the file system.

5. The apparatus of claim 1, wherein the changed files list is configured for use by a storage management process that is executed periodically or on demand, and wherein, for a current execution of the storage management process, only file change records in corresponding ones of the plurality of time buckets that are subsequent to an immediately previous execution of the storage management process are considered.

6. The apparatus of claim 1, wherein a file change involves any of a data change and a metadata change.

7. The apparatus of claim 1, wherein each of the files in the file change records is further associated with at least one of a file type, a change type, a list of parent identifiers of directories through which that file is accessible.

8. The apparatus of claim 1, wherein the changed files list only identifies the files that have changed to an exclusion of non-changed files.

9. The apparatus of claim 1, wherein the unique file identifier is determined independent of the plurality of time buckets.

10. The apparatus of claim 1, wherein the changed files list at least directly identifies the files that have changed directly based on time of change.

11. A method for managing file data, comprising the step of:
   at least one of creating and maintaining a changed files list that is partitioned into a plurality of time buckets, each of the plurality of time buckets directly representing a respective date and time period and being associated with file change records for files having a timestamp falling within the respective date and time period, each of the file change records associated with a unique file identifier and the timestamp for a corresponding one of the files, the timestamp specifying a date and a time corresponding to a latest one of a creation time or a most recent update time for the corresponding one of the files;
   comparing a current date and time against a timestamp for a given file;
   creating a new file change record for the given file and inserting the new file change record into a corresponding one of the plurality of time buckets having the respective time date and time period in which the timestamp falls, when an existing file change record does not exist for the given file;
   moving the existing file change record for the given file into the corresponding one of the plurality of time buckets having the respective time date and time period in which the timestamp falls, when the current date and time is different than the timestamp and the existing file change record already exists for the given file; and
   maintaining the existing file change record in a currently inserted time bucket, when the timestamp matches the current date and time and falls within the respective date and time period of the currently inserted time bucket and the existing file change record already exists for the given file,
   wherein the changed files list directly identifies the files that have changed based on the respective date and time periods of corresponding ones of the plurality of time buckets.

12. The method of claim 11, further comprising the step of using the changed files list for a storage management process.

13. The method of claim 11, wherein the method is implemented in a file system, and an amount of file change records in the changed files list is without change except when a new file is created or when an existing file is deleted from the file system.

14. The method of claim 11, wherein the method is used for a storage management process that is executed periodically or on demand, and the method comprises the step of, for a current execution of the storage management process, considering only file change records in corresponding ones of the plurality of time buckets that are subsequent to an immediately previous execution of the storage management process.

15. The method of claim 11, wherein a file change involves any of a data change and a metadata change.

16. The method of claim 11, wherein each of the files in the file change records is further associated with at least one of a file type, a change type, a list of parent identifiers of directories through which that file is accessible.

17. The method of claim 11, wherein time granularities of the plurality of time buckets are variable such that different ones of the plurality of time buckets are capable of representing different time periods.

18. A computer program product comprising a non-transitory computer readable storage medium including computer usable program code for managing file data, said computer program product including:
   computer usable program code for at least one of creating and maintaining a changed files list that is partitioned into a plurality of time buckets, each of the plurality of time buckets directly representing a respective date and time period and being associated with file change records for files having a timestamp falling within the respective date and time period, each of the file change records associated with a unique file identifier and the timestamp for a corresponding one of the files, the timestamp specifying a date and a time corresponding to a latest one of a creation time or a most recent update time for the corresponding one of the files;
   computer usable program code for comparing a current date and time against a timestamp for a given file;
   computer usable program code for creating a new file change record for the given file and inserting the new file change record into a corresponding one of the plurality of time buckets having the respective time date and time period in which the timestamp falls, when an existing file change record does not exist for the given file;
   computer usable program code for moving the existing file change record for the given file into the corresponding one of the plurality of time buckets having the respective time date and time period in which the timestamp falls, when the current date and time is different than the timestamp and the existing file change record already exists for the given file; and
   computer usable program code for maintaining the existing file change record in a currently inserted time bucket, when the timestamp matches the current date and time and falls within the respective date and time period of the currently inserted time bucket and the existing file change record already exists for the given file,
   wherein the changed files list directly identifies the files that have changed based on the respective date and time periods of corresponding ones of the plurality of time buckets.

19. The computer program product of claim 18, further comprising computer usable program code for using the changed files list for a storage management process.

20. The computer program product of claim 18, wherein the method is implemented in a file system, and an amount of file change records in the changed files list is without change except when a new file is created or when an existing file is deleted from the file system.

21. The computer program product of claim 18, wherein the method is used for a storage management process that is executed periodically or on demand, and the method comprises computer usable program code for, for a current execution of the storage management process, considering only file change records in corresponding ones of the plurality of time buckets that are subsequent to an immediately previous execution of the storage management process.

22. The computer program product of claim 18, wherein a file change involves any of a data change and a metadata change.

23. The computer program product of claim 18, wherein each of the files in the file change records is further associated with at least one of a file type, a change type, a list of parent identifiers of directories through which that file is accessible.

24. The computer program product of claim 18, further comprising computer usable program code for configuring time granularities of the plurality of time buckets to be variable such that different ones of the plurality of time buckets are capable of representing different time periods.

\* \* \* \* \*